(12) United States Patent
Salib

(10) Patent No.: US 6,876,783 B2
(45) Date of Patent: Apr. 5, 2005

(54) METHOD AND APPARATUS FOR INDUCING STRAIN INTO OPTICAL DEVICES

(75) Inventor: Michael S. Salib, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 208 days.

(21) Appl. No.: 10/147,022

(22) Filed: May 15, 2002

(65) Prior Publication Data

US 2003/0215184 A1 Nov. 20, 2003

(51) Int. Cl.$^7$ .............................................. G02F 1/295
(52) U.S. Cl. ........................................ 385/10; 372/26
(58) Field of Search .............................. 372/26, 27, 29, 372/38.02, 32, 50, 96, 45, 46; 257/14, 17, 18, 21, 22, 96, 97; 385/10

(56) References Cited

U.S. PATENT DOCUMENTS 6,288,410 B1 * 9/2001 Miyazawa .................... 257/14
6,337,868 B1 * 1/2002 Mizutani ...................... 372/27

OTHER PUBLICATIONS

Almashary, B.A., et al., "Stress–Induced Vertical Confinement of Light in Bulk GaAs and Si Substrates," IEEE Photonics Technology Letters, vol. 8, No. 10, Oct. 1996, pp. 1358–1360.

Lea, E., et al., "Photoelastic waveguides in silicon," Electronics Letters, vol. 32, No. 17, Aug. 15, 1996, pp. 1577–1579.

* cited by examiner

Primary Examiner—Karl D. Frech
(74) Attorney, Agent, or Firm—Blakely, Sokoloff, Taylor & Zafman LLP

(57) ABSTRACT

An optical device including strained and non-strained regions along an optical medium. In one aspect of the present invention, strain-inducing material disposed proximate to the optical medium induces one or more perturbations of a refractive index along the optical medium to selectively reflect an optical beam directed through the optical medium having a first center wavelength back out a first end of an optical path as remaining wavelengths of light are propagated through a second end. In another embodiment, an optical device may include a strained region disposed in a non-strained region so that one or more perturbations of the refractive index compensates for birefringence of an optical beam directed through the optical medium.

29 Claims, 5 Drawing Sheets

METHOD AND APPARATUS FOR INDUCING STRAIN INTO OPTICAL DEVICES

BACKGROUND OF THE INVENTION

1. Field of the Invention

The present invention relates generally to optical devices and, more specifically, the present invention relates to inducing strain in optical devices.

2. Background Information

The need for fast and efficient optical-based technologies is increasing as Internet data traffic growth rate is overtaking voice traffic pushing the need for optical communications. Commonly used optical components include diffraction gratings, thin-film filters, fiber Bragg gratings, and arrayed-waveguide gratings.

A fiber Bragg grating is an optical fiber device that includes an optical fiber with periodic changes in the refractive index of fiber core materials along the fiber length, which may be formed by exposure of the photosensitive core to an intense optical interference pattern. With the changes in the refractive index along the fiber length, optical beams at a particular wavelength are reflected by the fiber Bragg grating while other wavelengths are allowed to propagate through the fiber.

Inherent properties of materials may limit the manufacture and use of many optical devices. As a result, producing such optical devices can often be expensive and time consuming. For example, manufacturing a Bragg grating to achieve the changes of the refractive index along the fiber length can sometimes include complicated process steps. As another example, many materials become birefringent when subjected to mechanical strain. As a result, many gratings and other optical devices can exhibit an unwanted polarization dependence of an optical beam traveling through the device. Laser trimming or other processes may be used to address such a problem but can often be cumbersome as the process may involve modifying each device individually.

BRIEF DESCRIPTION OF THE DRAWINGS

The present invention is illustrated by way of example and not limitation in the accompanying figures.

DETAILED DESCRIPTION

Methods and apparatuses for providing an optical device including strained and non-strained regions are disclosed. In the following description numerous specific details are set forth in order to provide a thorough understanding of the present invention. It will be apparent, however, to one having ordinary skill in the art that the specific details need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

In one embodiment of the present invention, an optical device including a plurality of strained and non-strained regions along an optical medium are disclosed. In one embodiment a region of strain-inducing material disposed proximate to the optical medium induces one or more perturbations of a refractive index along the optical medium to selectively reflect an optical beam directed through the optical medium having a first center wavelength back out a first end of an optical path as remaining wavelengths of light are propagated through a second end. In another embodiment, an optical device may include a strained region disposed in a non-strained region so that one or more perturbations of the refractive index compensates for birefringence of an optical beam directed through the optical medium. Embodiments of the presently described optical devices may be utilized in optical networking systems or the like.

Figure 1:
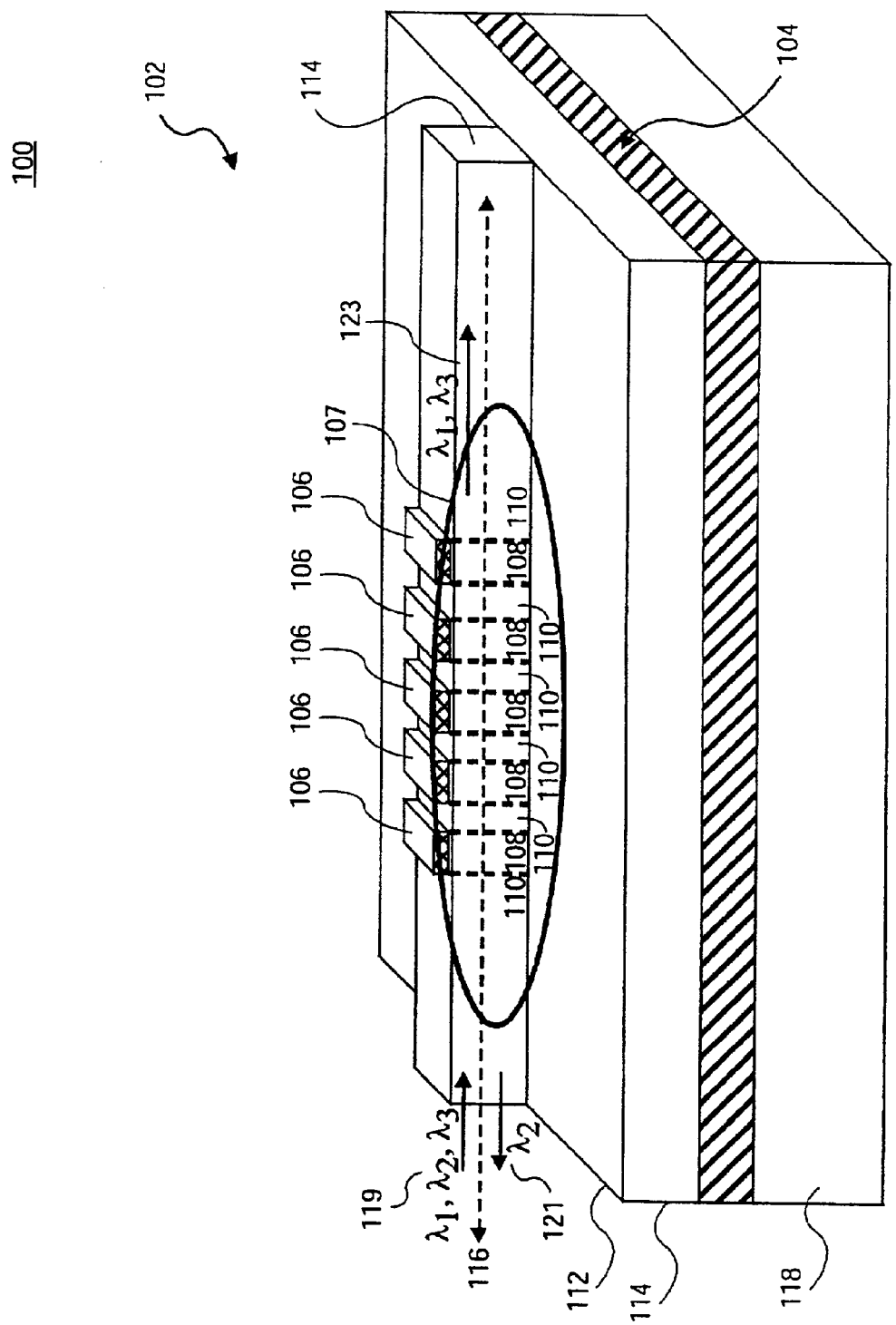
FIG. 1 is a perspective diagram illustrating one embodiment of an optical device including a Bragg grating having a plurality of strained and non-strained regions disposed in an optical medium in accordance with the teachings of the present invention.

To illustrate, FIG. 1 is a perspective diagram illustrating one embodiment of an optical device 100 including a plurality of strained regions 108 and non-strained regions 110 along an optical medium 112 in accordance with the teachings of the present invention. In one embodiment optical device 100 includes a Bragg grating and includes an optical waveguide 114 including an optical path 116. In one embodiment, optical medium 112 is included on a wafer 102. In one embodiment, wafer 102 is a silicon-on-insulator (SOI) wafer and includes a semiconductor substrate 114 and semiconductor substrate 118. In one embodiment, semiconductor substrate 114 includes silicon. In one embodiment, wafer 102 includes a buried oxide layer or insulating layer 104 disposed between semiconductor substrate 114 and semiconductor substrate 118.

In other embodiments, optical medium 112 includes semiconductor materials including for example 111-V materials such as gallium arsenide (GaAs), and may or may not be disposed in an SOI wafer. In another embodiment, optical medium 102 includes glass or silica. In yet another embodiment, optical medium 112 includes lithium niobate ($LiNbO_3$), indium phosphide (InP) or other related compounds.

In one embodiment, one or more regions of strain-inducing material 106 are disposed proximate to optical medium 112 to induce strain in optical medium 112. As a result, plurality of strained regions 108 and non-strained regions 110 are disposed along optical medium 112 such that one or more perturbations of a refractive index $n_{eff}$ are provided along optical path 116 to selectively reflect an optical beam 119 out a first end of optical path 116 and propagate remaining wavelengths of light through a second end. In one embodiment, inducing strain into optical medium 112 utilizes the photoelastic effect to selectively change the dielectric constant and therefore the refractive index $n_{eff}$ of optical medium 112. For example, in one embodiment strain-inducing material 106 includes silicon nitride ($Si_3N_4$). The typical stress of a thin film of silicon nitride on non-strained silicon is approximately $10^9$ dyne/$cm^2$. The strain-induced change or effective refractive index difference ($\Delta n_{eff}$) in the refractive index ($n_{eff}$) of optical medium 112 is approximated by the relation:

$$\Delta \epsilon \approx 2n_{eff} \Delta n_{eff},$$ (Equation 1)

where $\Delta \epsilon$ is the induced strain. In one embodiment, a change in refractive index of $\Delta n_{eff} \approx 0.02$ may be introduced at each interface between strained regions 108 and non-strained regions 110. It is appreciated that other suitable materials for the one or more regions of strain-inducing material 106 may be used in accordance with the teachings of the present invention and that silicon nitride is provided herewith only as an example material for explanation purposes. In another embodiment for example, silicon dioxide ($SiO_2$) or other suitable strain-inducing material may be used.

Returning to FIG. 1, in one embodiment, optical beam 119 includes a plurality of wavelengths including for example $\lambda_1$, $\lambda_2$ and $\lambda_3$. It is appreciated that although optical beam 119 has been illustrated to include three wavelengths $\lambda_1$, $\lambda_2$ and $\lambda_3$ in the illustrated example, a different number of wavelengths may be included in optical beam 119 in accordance with the teachings of the present invention.

As mentioned above, there are one or more perturbations in the refractive index $n_{eff}$ along optical path 116 through waveguide 114. As a result of the refractive index difference $\Delta n_{eff}$, a multiple reflection of optical beam 119 occurs at interfaces between strained regions 108 and non-strained regions 110 along optical path 116. In one embodiment, a Bragg reflection occurs when a Bragg condition or phase matching condition is satisfied. In particular, for uniform Bragg gratings, when the condition $$m\lambda_B = 2n_{eff}\Lambda,$$ (Equation 2)

is satisfied, where m is the diffraction order, $\lambda_B$ is the Bragg wavelength, $n_{eff}$ is the effective index of optical medium 112 and $\Lambda$ is the period of the grating, a Bragg reflection occurs.

To illustrate, FIG. 1 shows a Bragg condition existing for $\lambda_B$ equal to $\lambda_2$. Accordingly, an optical beam 119 including wavelength $\lambda_2$ is shown to be reflected back out of waveguide 114 out from the end into which optical beam 119 is directed. In addition, the remainder of optical beam 119 continues to propagate along optical path 116 through waveguide 114 such that the remaining wavelengths (e.g. $\lambda_1$ and $\lambda_3$) are included in the optical beam 123, which is propagated from the opposite end of waveguide 114. Accordingly, the Bragg wavelength $\lambda_2$ is filtered from optical beam 123. In one embodiment, optical beam 119 may be an optical communications beam or the like on which data is encoded. In one embodiment, wave division multiplexing (WDM) or dense wave division multiplexing (DWDM) or the like may be employed with optical beam 119 such that a different channel is encoded with each of the wavelengths (e.g. $\lambda_1$, $\lambda_2$, $\lambda_3$, etc.) included in optical beam 119.

As described above, a multiple reflection of optical beam 119 occurs at interfaces between strained regions 108 and non-strained regions 110 along optical path 116 created as a result of the refractive index difference $\Delta n_{eff}$ between the two regions. Thus, in one embodiment, optical path 116 has a plurality of periodic strain-induced perturbations indicated at position 107 of a refractive index $n_{eff}$ of optical medium 112. In one embodiment, a first center wavelength or Bragg wavelength, $\lambda_B$, that is included in a first portion 121 of optical beam 119 and reflected or filtered by optical device 100 is dependent on an amount of strain along the periodic or one or more perturbations of the refractive index $n_{eff}$ along optical medium 112. In one embodiment, reflecting first portion 121 of optical beam 119 includes controlling the refractive index $n_{eff}$ by controlling an amount of strain along the plurality of periodic strain-induced perturbations 107. As will be discussed below, in one embodiment, controlling the amount of strain includes varying a thickness of a layer of one or more regions of strain-inducing material 106 disposed proximate to optical medium 112 as well as varying a pitch of optical device 100.

Figure 2:
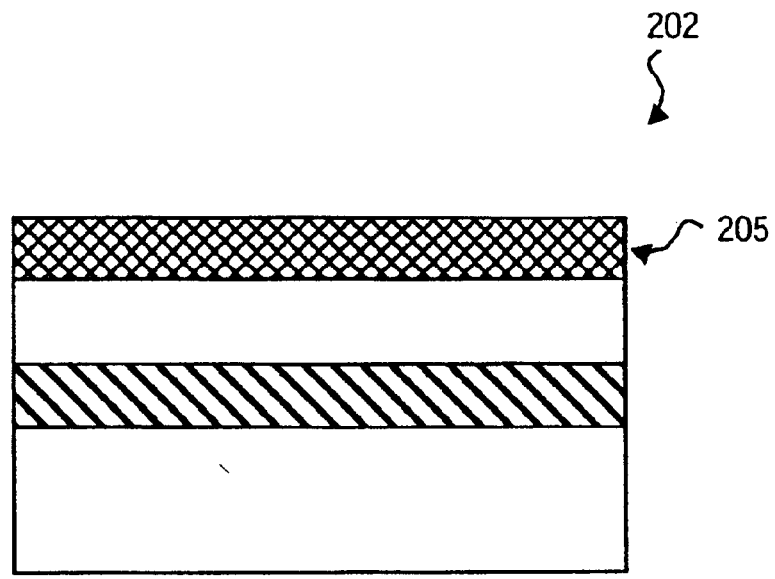
FIGS. 2–4 illustrate an embodiment of a process used to form an optical device similar to the optical device including the Bragg grating illustrated in FIG. 1 in accordance with the teachings of the present invention.
Figure 3:
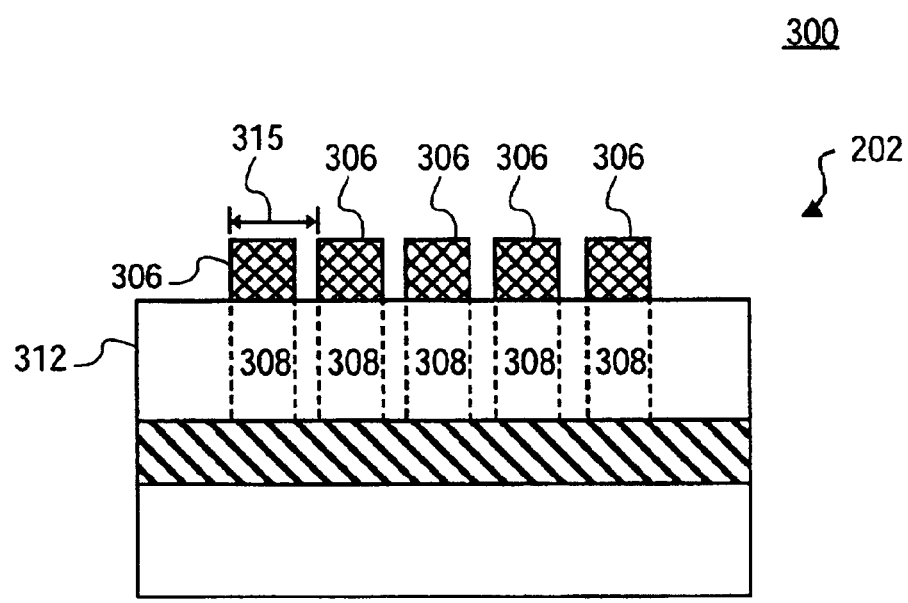
Figure 4:
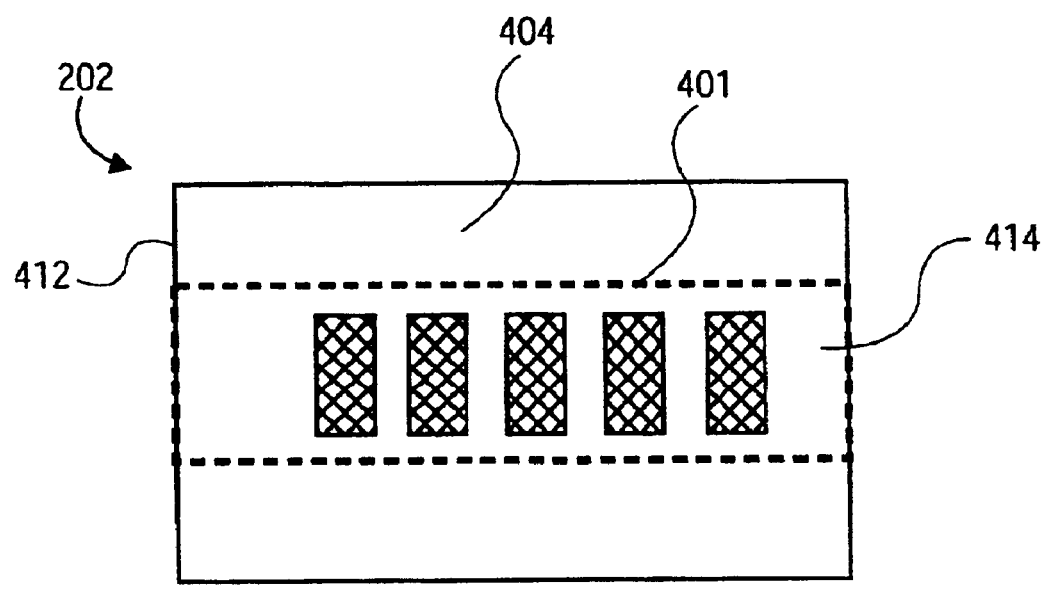

FIGS. 2–4 illustrate an embodiment of a process used to form an optical device similar to optical device 100 illustrated in FIG. 1 in accordance with the teachings of the present invention. FIG. 2 is a cross-sectional view of a wafer 202. In FIG. 2 a strain-inducing layer 205 including a strain-inducing material has been deposited on wafer 202. In one embodiment wafer 202 is a silicon-on-insulator (SOI) wafer. In one embodiment strain-inducing layer 205 includes a strain-inducing material such as silicon nitride. In another embodiment, strain-inducing layer 205 includes silicon oxide, or other suitable strain-inducing material.

FIG. 3 illustrates the conclusion of a process where in one embodiment a photoresist layer has been patterned to form a mask on wafer 202 and strain-inducing layer 205 has been etched to form one or more regions of strain-inducing material 306 that define strained regions 308 in wafer 202. In one embodiment, strained regions 308 are periodic. In one embodiment, the patterning is done using standard lithographic techniques well known in the art, which typically comprise depositing layers of the correct materials on the device, applying a photoresist on the wafer, exposing the photoresist in areas to be added (light mask) or removed (dark mask) and then performing the appropriate etch.

In one embodiment, the patterning is carried out using the lithographic process described above although other patterning processes such as ablation, ruling, or other techniques will be apparent to those skilled in the art. The etching can be carried out using either a dry or a wet process, and varieties of both wet and dry etching will be apparent to those skilled in the art and may be dependent upon the materials used for the photoresist layer.

In one embodiment, strain-inducing layer 205 has been etched to a pitch 315 having a width of a single region of strain-inducing material 306 and an adjacent exposed area of an optical medium 312. In one embodiment, an optical device 300 can be designed to reflect or filter a particular Bragg wavelength by varying pitch 315, and therefore the refractive index difference $\Delta n_{eff}$ of optical device 300. In one embodiment, the refractive index difference $\Delta n_{eff}$ is also changed by controlling the amount of strain along the plurality of perturbations of refractive index $n_{eff}$ by varying the thickness of one or more regions of strain-inducing material 306. As can be appreciated by those skilled in the art, an amount of strain to induce a refractive index difference $\Delta n_{eff}$ can be calculated experimentally or via a standard table providing values of an amount of strain induced by a particular strain-inducing material into silicon, or other suitable optical medium.

FIG. 4 illustrates a top view of wafer 202 before an optical waveguide 414 is patterned and etched in wafer 202. An area 404 outside of dotted lines 401 indicate areas of optical medium 412 to be etched away to form optical waveguide 414 disposed in optical medium 412. In one embodiment, the patterning and etching is done using standard lithographic techniques well known in the art, as described in the discussion relating to FIG. 3 above.

Figure 5:
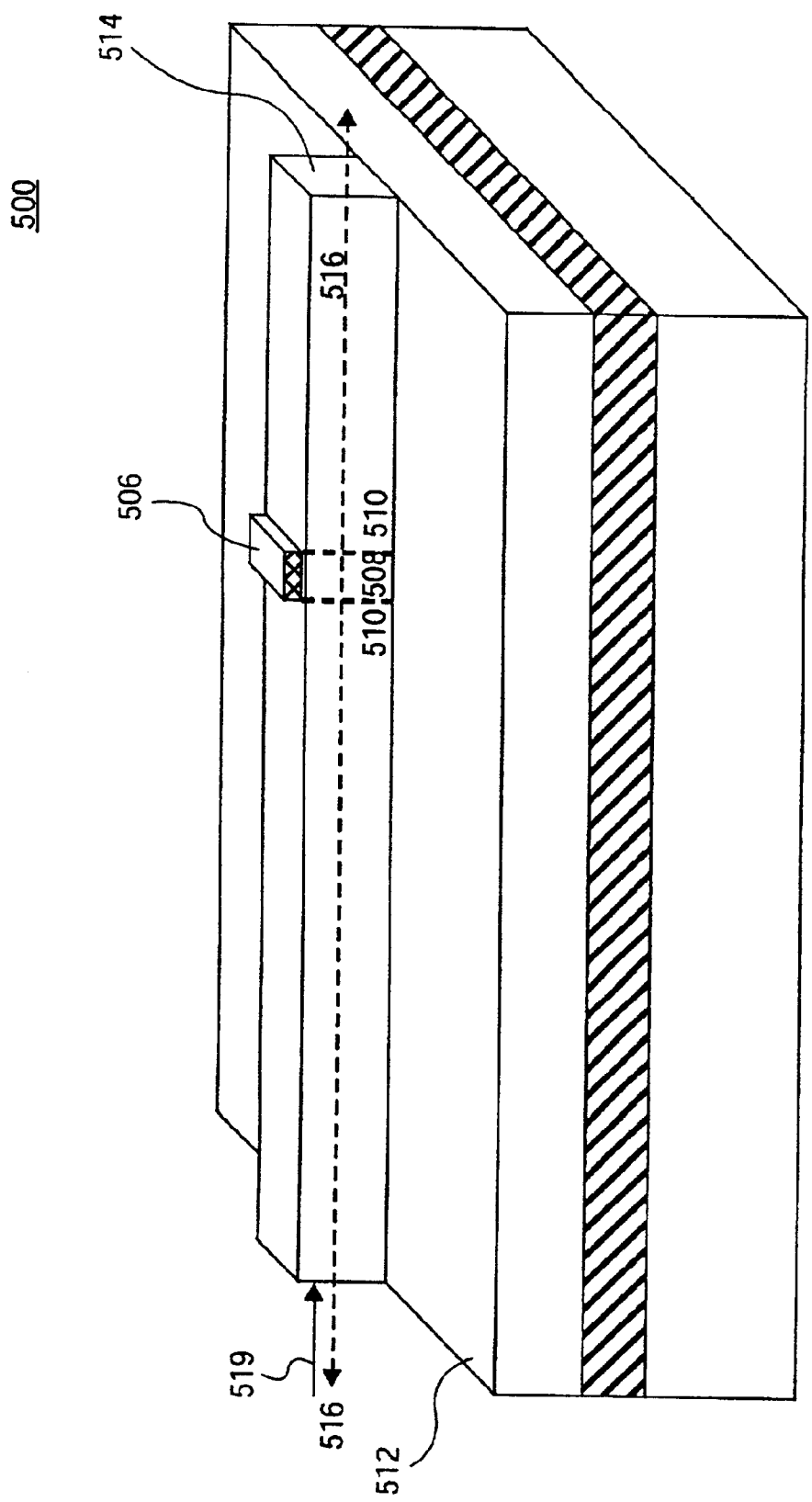
FIG. 5 is a perspective diagram illustrating another embodiment of an optical device including a strained and a non-strained region that can compensate for birefringence of an optical beam directed through an optical medium.

FIG. 5 is a perspective diagram illustrating another embodiment of an optical device 500 in accordance with the teachings of the present invention. As shown, one embodiment of optical device 500 includes a strained region 508 disposed in a non-strained region 510 of an optical medium 512 including a strain-induced perturbation of the refractive index $n_{eff}$ that can compensate for birefringence of an optical beam 519 directed through optical medium 512. As generally known to those skilled in the art, birefringence is the division of an optical beam into a plurality of beams that travel along different trajectories at different speeds as a result of the optical medium having different indices of refraction in different directions within the optical medium. In general, two beams are typically found to be plane polarized in mutually perpendicular directions. Accordingly, in one embodiment, negation of a polarization difference or a similar birefringence compensation can occur by directing a portion of optical beam 519 having one of the plurality of polarizations through a perturbation of the refractive index $n_{eff}$ of optical medium 512 along the optical path.

In one embodiment, a region of strain-inducing material 506 disposed proximate to optical medium 512 induces the perturbation of the refractive index $n_{eff}$. The perturbation of the refractive index $n_{eff}$ provides a refractive index difference to a portion of optical beam 519 having a plurality of polarizations to compensate for birefringence. In one embodiment, compensating for birefringence includes controlling the refractive index $n_{eff}$ of optical medium 512 by controlling an amount of strain at the perturbation of the refractive index $n_{eff}$. Thus, in other embodiments, depending upon the desired amount of birefringence compensation, more than one region of strain-inducing material 506 may be disposed proximate to optical medium 512 to control the amount of strain affecting the perturbation of the refractive index $n_{eff}$. In one embodiment, a thickness of one or more regions of strain-inducing material 506 varies the refractive index $n_{eff}$ of optical medium 512. Thus, controlling an amount of strain in the strained region providing the perturbation of the refractive index $n_{eff}$ includes varying the thickness of the one or more strain-inducing region 506.

In one embodiment, optical medium 512 includes a semiconductor material. In one embodiment, the semiconductor material is silicon. In other embodiments, other suitable semiconductor materials may be used such as for example gallium arsenide. In one embodiment optical medium 512 is included in an SOI wafer. In addition, it is appreciated that one or more regions of strain-inducing material 506 may be located in any suitable position proximate to optical medium 512 to provide birefringence compensation to optical beam 519.

Figure 6:
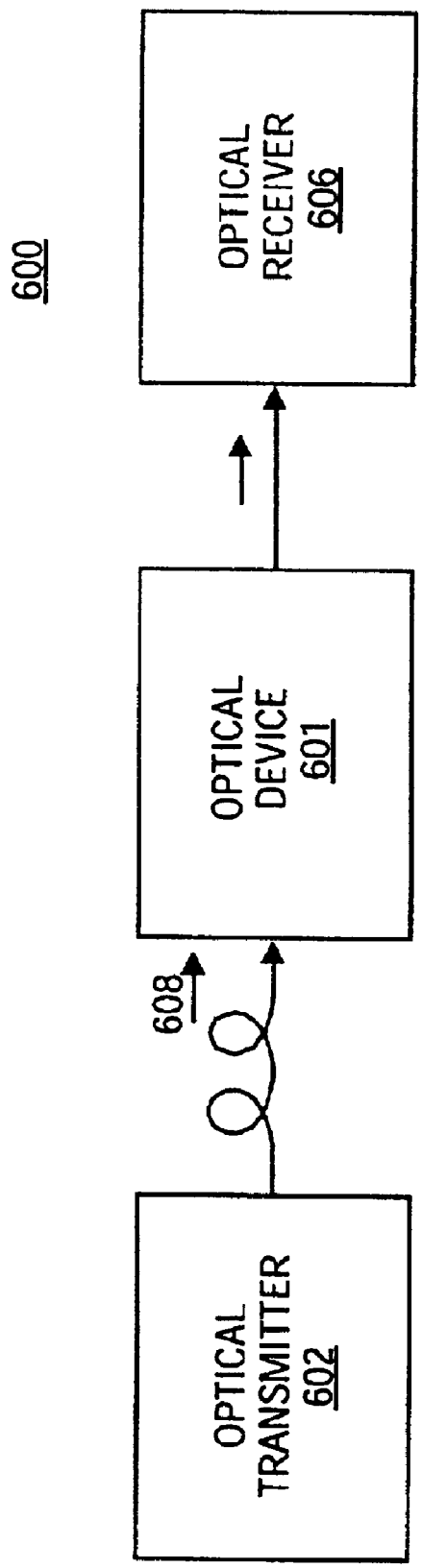
FIG. 6 is a diagram illustrating one embodiment of an optical communication system including an optical device including strained and non-strained regions in accordance with the teachings of the present invention.

FIG. 6 is a diagram illustrating one embodiment of an optical communication system including an optical device 601 in accordance with the teachings of the present invention. In various embodiments, optical device 601 may include a Bragg grating or a device to compensate for birefringence of an optical beam. In the depicted embodiment, optical communication system 600 includes an optical transmitter 602 to transmit an optical beam 608. An optical receiver is optically coupled to receive optical beam 608. It is appreciated that optical transmitter 602 and optical receiver 606 may also include optical transceivers and therefore have both transmitting and receiving capabilities for bi-directional communications. In one embodiment, optical device 601 is optically coupled between optical transmitter 602 and optical receiver 606. In the illustrated embodiment, optical device 601 is shown to be at the receiving end of optical communication system 600. In other embodiments, optical device 601 may be disposed at various locations along a transmission path or at the transmitting end of optical communication system 600. In one embodiment, optical device 600 may include a Bragg grating and be utilized in for example an add/drop filter enabling the addition or extraction of a channel from a wave division multiplexed (WDM) optical beam 608 transmitted from optical transmitter 602 along an optical path.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus, comprising:
    a plurality of strained and non-strained regions along an optical medium including one or more perturbations of a refractive index along the optical medium to selectively reflect a first center wavelength of an optical beam directed through the optical medium back out a first end of an optical path, remaining wavelengths of the optical beam to propagate through a second end of the optical path; and
    strain-inducing material disposed proximate to the optical medium.

2. The apparatus of claim 1 wherein the optical medium includes a semiconductor material.

3. The apparatus of claim 2 wherein the semiconductor material includes at least one of silicon, gallium arsenide, indium phosphide and lithium niobate.

4. The apparatus of claim 1 wherein the optical medium includes at least one of silica or glass.

5. The apparatus of claim 1 wherein the one or more perturbations of a refractive index are induced by the strain-inducing material disposed proximate to the optical medium.

6. The apparatus of claim 1 wherein the strain-inducing material includes at least one of silicon nitride (Si3N4) or silicon dioxide (SiO2).

7. The apparatus of claim 1 further comprising an optical waveguide disposed in the optical medium, the optical waveguide including the optical path.

8. The apparatus of claim 1 wherein the plurality of strained and non-strained regions including one or more perturbations of the refractive index along the optical medium provide a Bragg grating disposed in the optical medium.

9. The apparatus of claim 1 wherein the strain-inducing material disposed proximate to the optical medium has a pitch having a width of the strain-inducing material and an adjacent exposed area of the optical medium.

10. A method, comprising:
    directing an optical beam into a first end of an optical path having the first end and a second end disposed in an optical medium, the optical path having a plurality of periodic strain-induced perturbations of a refractive index of the optical medium along the optical path; and
    reflecting a first portion of the optical beam having a first center wavelength back out from the first end of the optical path.

11. The method of claim 10 wherein reflecting the first portion of the optical beam includes controlling the refractive index by controlling an amount of strain along the plurality of periodic strain-induced perturbations.

12. The method of claim 11 wherein controlling the amount of strain includes varying a thickness of a layer of a region of strain-inducing material disposed proximate to the optical medium.

13. An apparatus, comprising:
- a strained region disposed in a non-strained region along an optical medium including a strain-induced perturbation of a refractive index along the optical medium to compensate for birefringence of an optical beam directed through the optical medium;
- strain-inducing material disposed proximate to the optical medium;
- an insulating layer disposed proximate to the optical medium such that the optical medium is disposed between the strain inducing material and the insulating layer; and
- a substrate layer disposed proximate to the insulating layer such that the insulating layer is disposed between the optical medium and the substrate layer.

14. The apparatus of claim 13 wherein the optical medium includes a semiconductor material.

15. The apparatus of claim 14 wherein the optical medium is included in a silicon-on-insulator (SOI) wafer, wherein the insulating layer is the insulator of the SOI wafer.

16. The apparatus of claim 13 wherein the strain-induced perturbation is induced by the strain-inducing material disposed proximate to the optical medium.

17. The apparatus of claim 13 wherein the strain induced perturbation of the refractive index provides a refractive index difference to a portion of the optical beam having one of a plurality of polarizations to compensate for birefringence.

18. A method, comprising:
- directing an optical beam into a first end of an optical path having the first end and a second end disposed in an optical medium, the optical medium included in an optical waveguide defined in a semiconductor layer of a silicon-on-insulator (SOI) wafer including an insulating layer and a substrate layer, the substrate layer disposed proximate to the insulating layer such that the insulating layer is disposed between the optical medium and the substrate layer; and
- compensating for birefringence of the optical beam by directing a portion of the optical beam having one of a plurality of polarizations through a strain-induced perturbation of a refractive index of the optical medium along the optical path, the optical medium disposed between the insulating layer and strain-inducing material disposed proximate to the optical medium.

19. The method of claim 18 wherein compensating for birefringence includes controlling the refractive index of the optical medium to control an amount of strain at the strain-induced perturbation.

20. The method of claim 19 wherein controlling the amount of strain at the strain-induced perturbation includes varying a thickness of the strain-inducing material disposed proximate to the optical medium.

21. A method, comprising:
- patterning a mask on a silicon-on-insulator (SOI) wafer including a strain-inducing layer disposed over a semiconductor layer of the SOI wafer, the SOI wafer further including an insulating layer and a substrate layer, the insulating layer disposed between the semiconductor layer and the substrate layer, the semiconductor layer disposed between the strain-inducing layer and the insulating layer;
- etching the strain-inducing layer to define periodic strained regions in the semiconductor layer of the SOI wafer; and
- etching a waveguide in the semiconductor layer of the SOI wafer.

22. The method of claim 21 wherein patterning the mask comprises patterning a photoresist layer to form the mask.

23. The method of claim 21 wherein etching includes at least one of a wet etch and a dry etch.

24. A method, comprising:
- patterning a mask on a silicon-on-insulator (SOI) wafer including a strain-inducing layer disposed over a semiconductor layer of the SOI wafer, the SOI wafer further including an insulating layer and a substrate layer, the insulating layer disposed between the semiconductor layer and the substrate layer, the semiconductor layer disposed between the strain-inducing layer and the insulating layer;
- etching the strain-inducing layer to define a strained region in the semiconductor layer of the SOI wafer to compensate for birefringence; and
- etching a waveguide in the semiconductor layer of the SOI wafer.

25. The method of claim 24 wherein patterning the mask comprises patterning a photoresist layer to form the mask.

26. The method of claim 24 wherein etching includes at least one of a wet etch and a dry etch.

27. A system, comprising:
- an optical transmitter to transmit an optical beam;
- an optical receiver optically coupled to the optical transmitter to receive the optical beam; and
- an optical device including an optical medium defined in a semiconductor layer of a silicon-on-insulator (SOI) wafer and coupled between the optical transmitter and the optical receiver, the optical device to include a plurality of periodic strain-induced perturbations of a refractive index of the optical medium along an optical path, the SOI wafer including an insulating layer and a substrate layer, the insulating layer disposed between the semiconductor layer an the substrate layer, the semiconductor layer disposed between a strain-inducing layer disposed over the semiconductor layer and the insulating layer.

28. The system of claim 27 wherein the optical device includes a Bragg grating.

29. The system of claim 27 wherein the plurality of periodic strain-induced perturbations are induced by strain-inducing material disposed proximate to the optical medium.

* * * * *

UNITED STATES PATENT AND TRADEMARK OFFICE
CERTIFICATE OF CORRECTION

PATENT NO. : 6,876,783 B2
DATED : April 5, 2005
INVENTOR(S) : Salib

It is certified that error appears in the above-identified patent and that said Letters Patent is hereby corrected as shown below:

Column 2,
Line 51, delete "111-V" and insert -- III-V --.

Column 8,
Line 52, delete "an" and insert -- and --.

Signed and Sealed this

Fifth Day of July, 2005

JON W. DUDAS
*Director of the United States Patent and Trademark Office*